(12) United States Patent
Stenzel et al.

(10) Patent No.: US 7,518,948 B2
(45) Date of Patent: Apr. 14, 2009

(54) MARINE SEISMIC STREAMER HAVING SOLUBLE ENCAPSULANT SURROUNDING SEISMIC SENSORS THEREIN

(75) Inventors: Andre Stenzel, Richmond, TX (US); Bruce William Harrick, Sugar Land, TX (US); Troy L. McKey, III, LaPlace, LA (US); James Andrew Langley, III, Houston, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/287,978

(22) Filed: Oct. 14, 2008

(65) Prior Publication Data
US 2009/0038140 A1   Feb. 12, 2009

Related U.S. Application Data

(62) Division of application No. 11/472,974, filed on Jun. 22, 2006, now Pat. No. 7,460,434.

(51) Int. Cl.
*G01V 1/38* (2006.01)

(52) U.S. Cl. ............................ 367/20; 367/15; 367/153; 367/154

(58) Field of Classification Search .................. 367/15, 367/20, 153, 154
See application file for complete search history.

(56) References Cited

U.S. PATENT DOCUMENTS 3,437,171 A    4/1969   Davis et al.
4,300,218 A    11/1981  Kruka et al.
4,689,777 A    8/1987   Roever
4,809,243 A    2/1989   Bledsoe et al.
5,412,621 A    5/1995   Hepp
5,774,417 A    6/1998   Corrigan et al.
5,867,451 A    2/1999   Chang et al.

(Continued)

FOREIGN PATENT DOCUMENTS

GB    2 421 078    6/2006

OTHER PUBLICATIONS

S. P. Beerens, S. P. Van Ijsselmuide, C. Volwerk, E. Trouvé; Y. Doisy; "Flow Noise Anaylsis of Towed Sonar Arrays", Jun. 29-Jul. 1, 1999 UDTConference Proceedings Undersea Defence Technology, pp. 392--397, Nice, France, Nexus Medial Limited, Swanley. Kent.

(Continued)

*Primary Examiner*—Eric Bolda
*Assistant Examiner*—Scott A Hughes
(74) *Attorney, Agent, or Firm*—E. Eugene Thigpen; Richard A. Fagin

(57) ABSTRACT

A seismic streamer includes a jacket covering an exterior of the streamer. At least one strength member extends along the length of the streamer and is disposed inside the jacket. At least one seismic sensor is disposed in a sensor spacer affixed to the at least one strength member. An encapsulant is disposed between the sensor and the sensor spacer. The encapsulant is a substantially solid material that is soluble upon contact with a void filling material. A void filling material is disposed in the interior of the jacket and fills substantially all void space therein. The void filling material is introduced to the interior of the jacket in liquid form and undergoing state change to substantially solid thereafter.

7 Claims, 3 Drawing Sheets

U.S. PATENT DOCUMENTS

| | | |
|---|---|---|
| 5,943,293 A | 8/1999 | Luscombe et al. |
| 6,477,111 B1 | 11/2002 | Lunde et al. |
| 2004/0042341 A1 | 3/2004 | Tenghamn et al. |
| 2005/0013194 A1 | 1/2005 | Vaage et al. |

OTHER PUBLICATIONS

Search Report, Sep. 14, 2007.

MARINE SEISMIC STREAMER HAVING SOLUBLE ENCAPSULANT SURROUNDING SEISMIC SENSORS THEREIN

CROSS-REFERENCE TO RELATED APPLICATIONS

This application is a divisional application of, and claims priority from, U.S. Nonprovisional patent application Ser. No. 11/472,974 filed on Jun. 22, 2006 now U.S. Pat. No. 7,460,434, the entirety of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition equipment. More specifically, the invention relates to structures for a marine seismic streamer, and methods for making such streamers.

2. Background Art

Marine seismic surveying is typically performed using "streamers" towed near the surface of a body of water. A streamer is in the most general sense a cable towed by a seismic vessel. The cable has a plurality of seismic sensors disposed thereon at spaced apart locations along the length of the cable. The seismic sensors are typically hydrophones, but can also be any type of sensor that is responsive to the pressure in the water, or in changes therein with respect to time. The seismic sensors may also be any type of particle motion sensor or acceleration sensor known in the art. Irrespective of the type of such seismic sensors, the sensors generate an electrical or optical signal that is related to the pressure-related or motion-related parameter being measured by the sensors. The electrical or optical signals are conducted along electrical conductors or optical fibers, respectively, carried by the streamer to a recording system. The recording system is typically disposed on the seismic vessel, but may be disposed elsewhere.

In a typical marine seismic survey, a seismic energy source is actuated at selected times, and a record, with respect to time, of the signals detected by the one or more sensors is made in the recording system. The recorded signals are later used for interpretation to infer structure of, fluid content of, and composition of rock formations in the Earth's subsurface. Structure, fluid content and mineral composition are typically inferred from characteristics of seismic energy that is reflected from subsurface acoustic impedance boundaries. One important aspect of interpretation is identifying those portions of the recorded signals that represent reflected seismic energy and those portions which represent noise.

In order to improve the quality of seismic data interpretation, one goal of marine seismic streamer design is to reduce the various forms of noise detected by the seismic sensors. A typical marine seismic streamer can be up to several kilometers in length, and can include thousands of individual seismic sensors. Because of the weight of all of the materials used in a typical marine seismic sensor, because of the friction (drag) caused by the streamer as it is moved through the water, and because of the need to protect the seismic sensors, electrical and/or optical conductors and associated equipment from water intrusion, a typical seismic streamer includes certain features. First, the streamer includes one or more strength members to transmit axial force along the length of the streamer. The strength member is operatively coupled to the seismic vessel and thus bears all the axial loading caused by drag (friction) of the streamer in the water. The streamer also includes, as previously explained, electrical and/or optical conductors to carry electrical power and/or signals to the various sensors and (in certain streamers) signal conditioning equipment disposed in the streamer and to carry signals from the various sensors to a recording station. The streamer also typically includes an exterior jacket that surrounds the other components in the streamer. The jacket is typically made from a strong, flexible plastic such as polyurethane, such that water is excluded from the interior of the jacket, and seismic energy can pass essentially unimpeded through the jacket to the sensors. A typical streamer also includes buoyancy devices at spaced apart locations along its length, so that the streamer is substantially neutrally buoyant in the water. The interior of the jacket is typically filled with oil or similar electrically insulating fluid that is substantially transparent to seismic energy.

The typical fluid-filled streamer structured as described above is well proven and has been used in the seismic surveying industry for a considerable time. However, there are some disadvantages to the fluid-filled streamer structure described above. One such disadvantage is leakage of the fluid into the surrounding water when a streamer section is damaged or the outer jacket is cut. This allows water to enter interstices of a streamer cable and cause electrical failure of components in the streamer. At the same time, the streamer buoyancy is compromised. Because the fluid in the streamer is typically a hydrocarbon-based fluid, such as kerosene or light oil, such leakage can cause environmental damage. Damage to the streamer can occur while the streamer is being towed through the water or it can occur while the streamer is being deployed from or retrieved onto a winch on which streamers are typically stored on the seismic tow vessel.

Another disadvantage to using fluid-filled streamers is that detectable noise can be generated by vibrations resulting from the streamer being towed through the water.

Such vibrations can cause internal pressure waves that travel through the fluid inside the streamer, such waves often being referred to as "bulge waves" or "breathing waves." Such noise is described, for example, in S. P. Beerens et al., *Flow Noise Analysis of Towed Sonar Arrays*, UDT 99—Conference Proceedings Undersea Defense Technology, Jun. 29-Jul. 1, 1999, Nice, France, Nexus Media Limited, Swanley, Kent. Noise in the form of pressure waves can be detected by the seismic sensors, making identification of reflected seismic energy in the recorded signals more difficult.

Still another disadvantage to fluid-filled seismic streamers known in the art is that transient motion of the various components of the streamer can induce detectable noise in the streamer. Ideally, during a seismic survey the entire streamer would move through the water at substantially constant velocity, and all the streamer components (i.e., the outer jacket, connectors, spacers, strength members, and filling fluid) would also move at the same constant velocity and thus not move with respect to each other. Under actual seismic survey conditions, however, motion of the seismic streamer is not uniform throughout the streamer, and this lack of uniform motion can lead to transient motion of various components, most notably the strength members. Transient motion can be caused by events such as pitching and heaving of the streamers; strumming of towing cables attached to the streamers (the strumming caused by vortex shedding on the cables), and operation of depth-control devices located on the streamers.

Transient motion of the strength members can cause transient longitudinal displacement of the spacers or connectors, causing pressure fluctuations in the fluid that are detected by the seismic sensors. Pressure fluctuations in the fluid that radiate away from the spacers or connectors can also cause the flexible outer jacket to bulge in and out as a traveling wave, giving this phenomenon its name. So called "bulge waves" can be detected by the seismic sensors. Another type of noise that can be caused by transient motion of the strength members will be further discussed below.

Other types of noise, generally called "flow noise", can also affect the signals detected by the seismic sensors. For example, vibrations in and along the seismic streamer can cause extensional waves in the outer jacket and can cause resonance transients to travel along the strength members. A turbulent boundary layer created around the outer jacket of the streamer by the act of towing the streamer in the water can also cause pressure fluctuations in the fluid filling the streamer.

In fluid-filled streamers, extensional waves in the jacket, resonance transients, and turbulence-induced noise are typically smaller in amplitude than bulge waves. Bulge waves are usually the largest source of vibration noise because these waves travel within the fluid core material filling the streamer and thus act directly on the seismic sensors. Nonetheless, all of these noise sources cumulatively can affect the detection of reflected seismic energy from the Earth formations below the water bottom, and thus affect the quality of seismic surveys.

Several methods and structures for streamers have been devised to reduce the foregoing types of noise. One such structure includes compartment isolation blocks within a fluid-filled streamer section to stop the vibration-caused bulge waves from traveling continuously along the entire length of the streamer. Another such noise reducing structure includes open-cell foam disposed in the interior of the streamer. The open-cell foam restricts the movement of the fluid in response to transient pressure changes and causes transient pressure energy to be dissipated into the outer jacket and the foam over a shorter longitudinal distance. Another structure used to reduce noise includes combining (summing) the signals from several longitudinally spaced apart seismic sensors to attenuate effects of relatively slow-moving bulge waves or similar noise. In such structures, an equal number of seismic sensors are positioned between or on both sides of each of the spacers in a streamer segment so that longitudinally equally spaced apart (from the spacer) pairs of seismic sensors detected equal yet opposite polarity pressure changes. Summing the signals from all the sensors in such a group can thus effectively cancel some of the noise.

Another approach to reducing the effects of bulge waves is to eliminate the fluid from the streamer sections entirely, so that no medium exists in which bulge waves can propagate. This approach is exemplified by so-called "solid" streamers, in which each streamer section is filled with a solid core material instead of a fluid. However, in any solid material, some shear waves will develop, which can increase some types of noise detected by the seismic sensors. Shear waves, of course, for the most part cannot propagate in a fluid filled streamer because fluids have substantially zero shear modulus (at least as compared with typical solid materials). Additionally, many conventional solid core materials are not substantially acoustically transparent to pressure waves, thus reducing the sensitivity of such streamers to reflected seismic energy. To deal with the foregoing limitations of using solid fill material in a streamer, another approach to reducing noise in streamers has been developed, which is to replace the fluid with a semi-solid or gelatin-like filler material. Such semi-solid filler material is flexible and acoustically transparent to seismic energy. The use of semi-solid material may reduce the development of bulge waves as compared to those in a fluid filled streamer, because the semi-solid material has much lower compressibility than fluid and thus reduces longitudinal displacement of the spacers. A semi-solid material may also reduce the transmission of shear waves as compared with that of a solid streamer.

Using a semi-solid material as described above substantially attenuates bulge waves, but noise resulting from the so called "Poisson Effect" from the strength members can actually increase as compared to fluid filled streamers. The Poisson Effect is characterized by a change in diameter of the strength member as the tension applied to the strength member changes. The diameter change will be related to the magnitude of the tension change and to Poisson's ratio of the material used for the strength member. As previously explained, various effects on the streamer can cause tension transients along the strength members. Tension transients typically propagate along the length of the strength member at a velocity related to the elastic modulus of the material used to make the strength member. As such tension transients travel along the strength member, a corresponding change in diameter of the strength member occurs. Changes in diameter of the strength member can induce compressional waves in the media that fills the streamer. In streamers which use a semi-solid material filler, the amplitude of such induced compressional waves may be greater than in a fluid filled streamer because the compressibility of fluid is typically lower than the compressibility of the semi-solid material. In a typical streamer, seismic sensors are each disposed within a suitable opening in a sensor spacer. Each sensor spacer is adhesively coupled to the strength members, wherein the strength members pass through suitable openings in the spacers. Sensor spacers are typically made from dense, rigid plastic to protect the sensor from damage during handling and use. While effective at reducing damage to the sensors, the sensor spacers also effectively couple Poisson Effect noise, among other types of noise, from the strength members to the sensors.

It is desirable to have a seismic streamer that takes advantage of the benefits of semi-solid filling materials, while having reduced amplitude of compressional waves (Poisson Effect waves) resulting from tension transients and other types of noise passing along the strength members.

SUMMARY OF THE INVENTION

A seismic streamer according to one aspect of the invention includes a jacket covering an exterior of the streamer. At least one strength member extends along the length of the streamer and is disposed inside the jacket. At least one seismic sensor is disposed in a sensor spacer affixed to the at least one strength member. An encapsulant is disposed between the sensor and the sensor spacer. The encapsulant is a substantially solid material that is soluble upon contact with a void filling material. A void filling material is disposed in the interior of the jacket and fills substantially all void space therein. The void filling material is introduced to the interior of the jacket in liquid form and undergoing state change to substantially solid thereafter.

A method for making a seismic streamer according to another aspect of the invention includes encapsulating at least one seismic sensor with a material that undergoes state change from solid to liquid upon contact with a void filling material. The encapsulated seismic sensor is inserted into an opening in a seismic sensor spacer. The sensor spacer is affixed to at least one strength member. The at least one strength member and the at least one sensor spacer affixed thereto are inserted into an acoustically transparent jacket. The jacket is filled with a void filling material. The void filling material is introduced in liquid form and undergoes state change to substantially solid thereafter. The void fill material dissolves the encapsulant.

Other aspects and advantages of the invention will be apparent from the following description and the appended claims.

DETAILED DESCRIPTION

Figure 1:
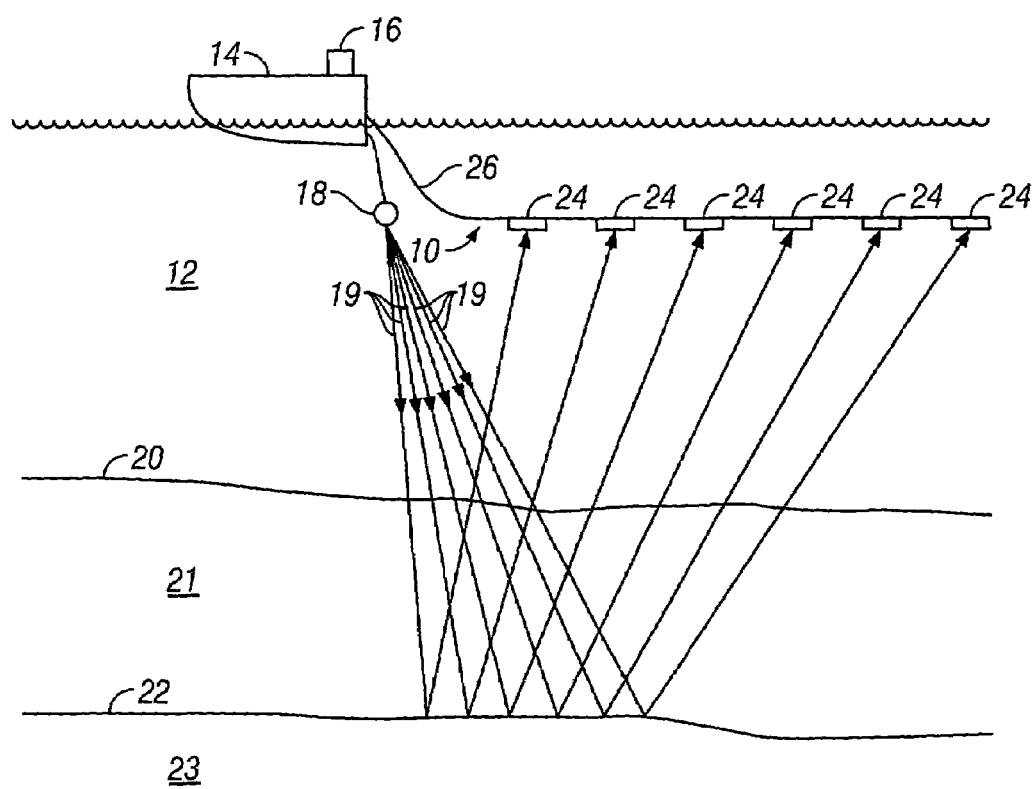
FIG. 1 shows typical marine seismic data acquisition using a streamer according to one embodiment of the invention.
Figure 4:
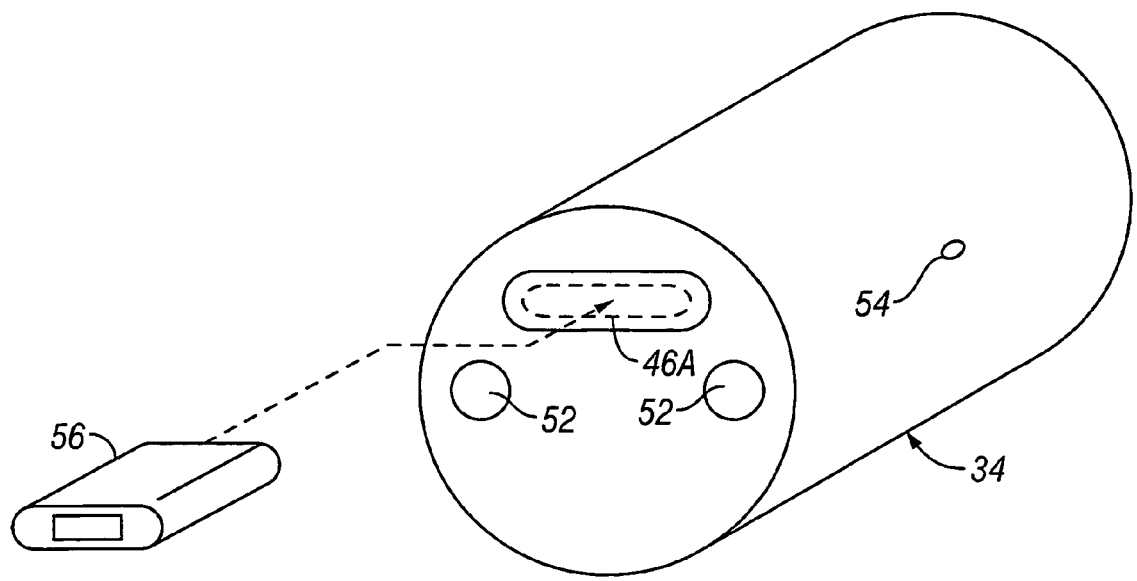
FIG. 4 shows one embodiment of assembly of a seismic sensor to a spacer according to the invention.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24, as will be explained in more detail below with reference to FIG. 4, are formed by mounting a seismic sensor inside a sensor spacer.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected energy such as its amplitude and phase.

Figure 2:
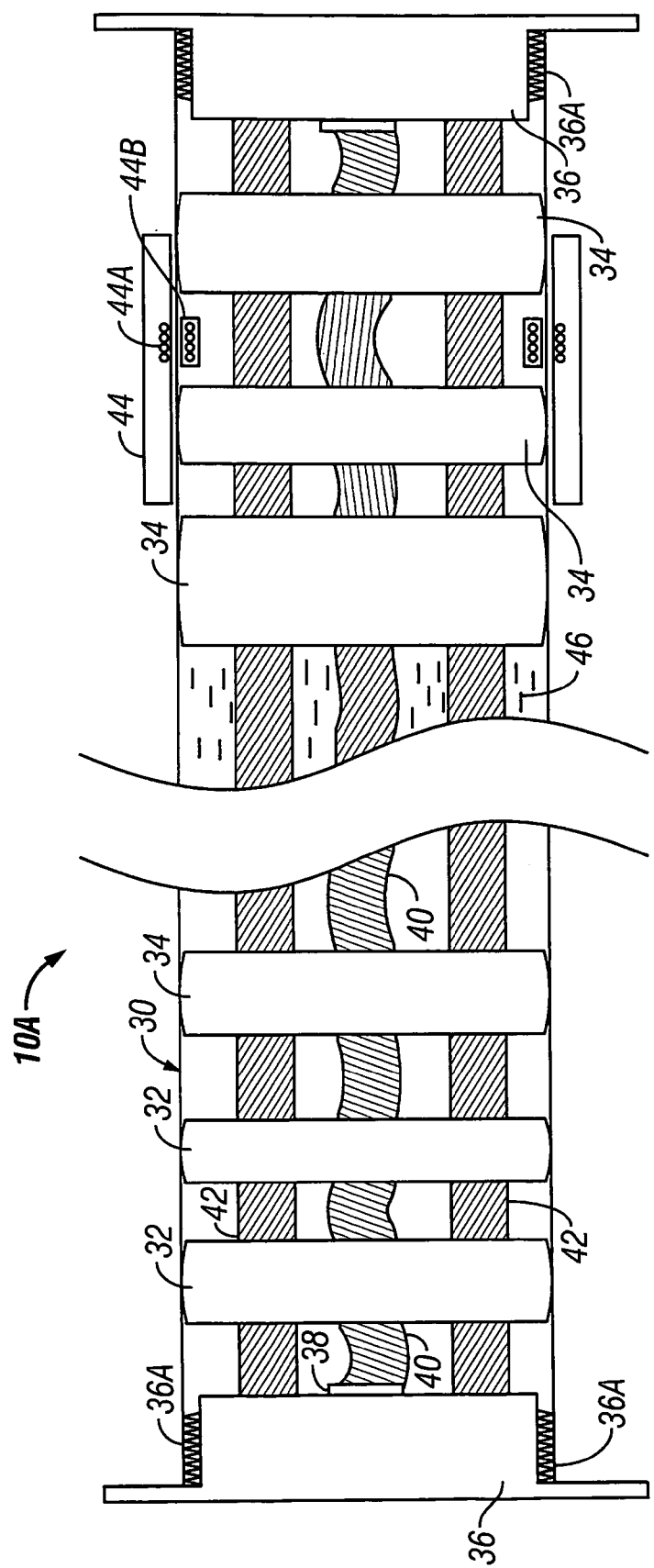
FIG. 2 shows a cut away view of one embodiment of a streamer segment according to the invention.

Having explained the general method of operation of a marine seismic streamer, an example embodiment of a streamer according to the invention will be explained with reference to FIG. 2. FIG. 2 is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A as shown in FIG. 2 connected end to end behind the vessel (14 in FIG. 1).

The streamer segment 10A in the present embodiment may be about 75 meters overall length. A streamer such as shown at 10 in FIG. 1 thus may be formed by connecting a selected number of such streamer segments 10A end to end. The segment 10A includes a jacket 30, which in the present embodiment can be made from 3.5 mm thick transparent polyurethane and has a nominal external diameter of about 62 millimeters. In each streamer segment 10A, each axial end of the jacket 30 may be terminated by a coupling/termination plate 36. The coupling/termination plate 36 may include rib elements 36A on an external surface of the coupling/termination plate 36 that is inserted into the end of the jacket 30, so as to seal against the inner surface of the jacket 30 and to grip the coupling/termination plate 36 to the jacket 30 when the jacket 30 is secured by and external clamp (not shown). In the present embodiment, two strength members 42 are coupled to the interior of each coupling/termination plate 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination plates 36 are coupled together using any suitable connector, so that the axial force is transmitted through the coupling/termination plates 36 from the strength members 42 in one segment 10A to the strength member in the adjoining segment.

The segment 10A can include a number of buoyancy spacers 32 disposed in the jacket 30 and coupled to the strength members 42 at spaced apart locations along their length. The buoyancy spacers 32 may be made from foamed polyurethane or other suitable, selected density material. The buoyancy spacers 32 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and void fill materials having suitable specific gravity.

The segment 10A includes a generally centrally located conductor cable 40 which can include a plurality of insulated electrical conductors (not shown separately), and may include one or more optical fibers (not shown separately). The cable 40 conducts electrical and/or optical signals from the sensors (which will be further explained below with reference to FIGS. 3 and 4) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers may be terminated in a connector 38 disposed in each coupling/termination plate 36 so that when the segments 10A are connected end to end, corresponding electrical and/or optical connections may be made between the electrical conductors and optical fibers in the conductor cable 40 in adjoining segments 10A.

Sensors, which in the present embodiment may be hydrophones, can be disposed inside sensor spacers, shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each streamer segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers. A marine seismic streamer having particle motion sensors is described in U.S. patent application Ser. No. 10/233,266, filed on Aug. 30, 2002, entitled, Apparatus and Method for Multicomponent Marine Geophysical Data Gathering, assigned to an affiliated company of the assignee of the present invention and incorporated herein by reference.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present embodiment, the interior space of the jacket 30 may be filled with a void filling material 46 such as "BVF" (Buoyancy Void Filler), which may be a curable, synthetic urethane-based polymer. The BVF 46 serves to exclude fluid (water) from the interior of the jacket 30, to electrically insulate the various components inside the jacket 30, to add buoyancy to a streamer section and to transmit seismic energy freely through the jacket 30 to the sensors 34. The BVF 46 in its uncured state is essentially in liquid form. Upon cure, the BVF 46 no longer flows as a liquid, but instead becomes a substantially gel-like substantially solid. Thus, the BVF 46 upon cure retains some flexibility to bending stress, substantial elasticity, and freely transmits seismic energy to the sensors 34. It should be understood that the BVF used in the present embodiment only is one example of a gel-like substance that can be used to fill the interior of the streamer segment 10A. For purposes of the invention, it is only necessary that the BVF 46 have the capacity to dissolve a material that encapsulates the seismic sensors (explained further below) prior to assembly of the streamer segment 10A and cure of the BVF 46.

The sensor spacers 34, as explained in the Background section herein, are typically molded from a rigid, dense plastic to better protect the seismic sensors therein from damage during handling and use. While effective in reducing incidence of damage to the seismic sensors, the rigid plastic used in the sensor spacers 34 also efficiently couples noise from the strength members 42 to the seismic sensor therein. Also as explained in the Background section herein, one source of noise is the Poisson Effect, wherein stretching of the strength members 42 under axial tension causes them to undergo a reduction in diameter. When the axial tension is reduced on the strength members 42, they increase diameter. The strength members 42 are typically tightly fit in, and adhesively bonded to through passages (52 in FIGS. 3 and 4) in the sensor spacers 34, and thus diameter changes in the strength members 42 are efficiently transferred to the sensor spacers 34, thus providing a source of noise that can be detected by the seismic sensors.

Figure 3:
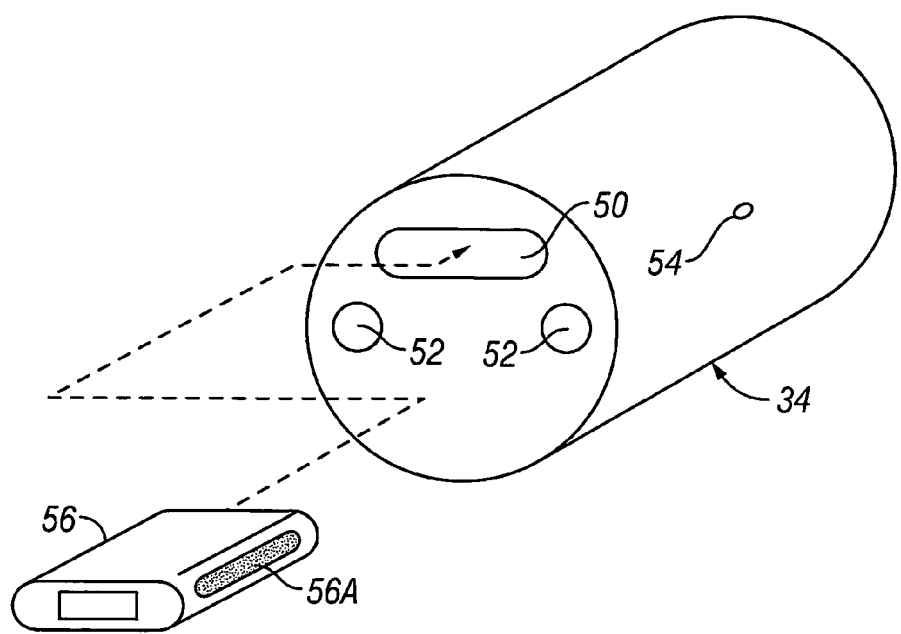
FIG. 3 shows a prior art assembly of a seismic sensor to a spacer.

FIG. 3 illustrates the manner known in the art prior to the present invention in which seismic sensors are mounted in the sensor spacers. The spacer 34 includes an opening 50 shaped to accept a seismic sensor 56. The sensor 56 in this embodiment can be the model number T-2BX hydrophone made by Teledyne Geophysical Instruments, explained above with reference to FIG. 2. The housing of the sensor 56 includes ribs 56A on its lateral edges, such that when the sensor 56 is inserted into the opening 50, the sensor 56 is retained in the opening 50 by interference fit. The spacer 34 also includes through passages 52 through which the strength members (42 in FIG. 2) are inserted. An adhesive port 54 is provided on the spacer 34, and into which adhesive (not shown) is injected after the strength members (42 in FIG. 2) are inserted into the through passages 52.

In making a streamer according to the invention, and referring to FIG. 4, the sensor 56 may be made such that its housing no longer includes the external ribs (56A in FIG. 3). Generally, the sensor 56 housing is smaller in dimension than the corresponding dimensions in the opening 50 in the sensor spacer 34, such that there is substantially no interference between the sensor 56 and the spacer 34. In the present embodiment the sensor 56 can be mounted and retained in the spacer 34 by using an encapsulant 46A formed from a material that changes state from substantially solid to liquid when the encapsulant 46A comes into contact with the gel (46 in FIG. 2). Examples of such materials can include paraffin of a sufficient molecular weight to be substantially solid at ordinary ambient temperatures (0 to 40 degrees C.), yet remain soluble in, for example, certain hydrocarbon-based solvents and/or oils. The material used for the encapsulant 46A may also be paraffin hardened using stearic acid, or a semi-solid hydrocarbon composition similar in consistency to household petroleum jelly.

The sensor 56 having the solid phase encapsulant 46A surrounding it can be placed in the opening 50 in the sensor spacer 34. The sensor spacer 34 may be assembled to the strength member(s) 42 and inserted into the jacket (30 in FIG. 2). Gel (46 in FIG. 2) may then be inserted into the interior of the jacket 30 in its liquid form. Upon contact with the uncured gel 46, the encapsulant 46A will begin dissolve so as to change state to liquid form, leaving the sensor 56 surrounded by a liquid film. Substantially contemporaneously, the gel 46 will undergo cure, such that the liquid film (liquefied encapsulant 46A) surrounding the sensor 56 is effectively trapped in place in the cured gel 46.

Noise induced in the spacer 34 such as from Poisson Effect in the strength members (42 in FIG. 2) will be efficiently isolated from the sensor 56 by the liquefied (dissolved) encapsulant 46A. By acoustically isolating the sensor 56 from the spacer 34, Poisson Effect noise and other forms of noise are less likely to be coupled from the spacer 34 to the sensor 56. Preferably the liquefied encapsulant 46A has acoustic properties sufficiently different from the BVF and the spacers 34 such that substantial acoustic isolation is attained between the spacer 34 and the sensor 56.

In making a streamer according to the invention, seismic sensors are assembled to respective sensor spacers as explained above with reference to FIG. 4. The sensor spacers are then positioned along the strength members (42 in FIG. 2) at their desired positions. Buoyancy spacers (32 in FIG. 2) are also typically assembled to the strength members (42 in FIG. 2) at spaced apart locations to provide the streamer with a selected overall density. The cable (40 in FIG. 2) may then be coupled as required to the individual sensors (56 in FIG. 4). The assembled sensors 56, sensor spacers 34, buoyancy spacers 32 and strength members 42 are then inserted into the jacket (30 in FIG. 2). Termination plates (36 in FIG. 2) are then affixed to the streamer segment ends. The interior of the jacket 30 may then be filled with the gel (46 in FIG. 2).

Streamers and streamer segments made according to the various aspects of the invention may have reduced noise resulting from transient tension of the strength members, for increased accuracy in seismic surveying.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making a seismic streamer, comprising:
   encapsulating at least one seismic sensor with a material that undergoes state change from solid to liquid upon contact with a void filling material;
   inserting the encapsulated seismic sensor into an opening in a seismic sensor spacer;
   affixing the sensor spacer to at least one strength member;
   inserting the at least one strength member and the at least one sensor spacer affixed thereto into an acoustically transparent jacket; and
   filling the jacket with a void filling material, the void filling material introduced in liquid form and undergoing state change to substantially solid thereafter, the void filling material dissolving the encapsulating material.

2. The method of claim 1 further comprising affixing at least one buoyancy spacer to the at least one strength member prior to the inserting into the jacket.

3. The method of claim 1 wherein the material filling the jacket is introduced in liquid form and undergoes state change thereafter.

4. The method of claim 1 further comprising connecting a cable to the seismic sensor prior to the inserting into the jacket.

5. The method of claim 1 wherein the encapsulating material comprises paraffin.

6. The method of claim 1 wherein the encapsulating material comprises paraffin hardened with stearic acid.

7. The method of claim 1 further comprising affixing a termination plate to each end of the at least one strength member and coupling each termination plate to an interior surface of the jacket at the ends thereof.

* * * * *